United States Patent [19]

Bagby et al.

[11] Patent Number: 4,695,139

[45] Date of Patent: Sep. 22, 1987

[54] PLURAL-ZONE MIRROR FOCUSING SYSTEM

[75] Inventors: John P. Bagby, Anaheim Hills; Richard L. Hedden, Los Angeles, both of Calif.

[73] Assignee: Hughes Aircraft Company, Los Angeles, Calif.

[21] Appl. No.: 686,334

[22] Filed: Dec. 26, 1984

[51] Int. Cl.$^4$ ........................ G02B 17/06; G02B 17/08
[52] U.S. Cl. .................................... 350/620; 350/613; 350/443
[58] Field of Search ............... 350/613, 620, 619, 505, 350/504, 442, 443

[56] References Cited

U.S. PATENT DOCUMENTS

| 3,460,886 | 8/1969 | Rumsey | 350/620 |
| 3,527,526 | 9/1970 | Silvertooth | 350/620 |
| 4,421,385 | 12/1983 | Yamaguchi | 350/640 |

FOREIGN PATENT DOCUMENTS

| 472319 | 10/1975 | U.S.S.R. | 350/620 |
| 491911 | 11/1975 | U.S.S.R. | 350/620 |
| 492842 | 11/1975 | U.S.S.R. | 350/620 |
| 648931 | 2/1979 | U.S.S.R. | 350/619 |

Primary Examiner—Jon W. Henry

Attorney, Agent, or Firm—Lewis B. Sternfels; Ronald L. Taylor; A. W. Karambelas

[57] ABSTRACT

A folded optical system is provided in the form of a telescope (20) for viewing distant objects. At least two optical elements (22, 24) have curved surfaces (32, 34) for imaging rays of radiation from a distant object. The two surfaces are positioned so as to permit a series of reflections therebetween for magnification of the resulting focal length of the optical system and diminution in the overall viewing angle so as to attenuate any light which may emanate from sources of radiation disposed off an optical axis which intercepts the object being viewed. One or more of the optical elements may be provided with apertures (30) through which rays of radiation are directed to a sensor (26) of the radiation, the sensor being positioned on a image plane to receive an image of the objects being viewed. First and second ones of the optical surface may be concave and convex, respectively, or alternatively, each optical surface may be concave with a folding mirror being utilized in the reflection of rays therebetween. One or more of the optical surfaces (32), or the surface of the folding mirror is fabricated as a set of zones (36) on a common substrate wherein each zone is utilized solely in the performance of one set of reflections in the series of reflections of the rays. Thereby, each zone can be separately configured for compensation of any aberrations and for clarifying the resulting image.

5 Claims, 7 Drawing Figures

PLURAL-ZONE MIRROR FOCUSING SYSTEM

BACKGROUND OF THE INVENTION

This invention relates to optical imaging systems employing a series of reflecting elements and, more particularly, to a system having multiple reflections from sets of zones on each of a set of mirrors for exclusion of light from sources outside the viewing angle of the system.

Optical imaging systems are employed over various portions of the spectrum including both the visual and the infra-red portions of the spectrum. Our particular interest is the imaging of objects at long distance by telescopes and cameras. Optical elements including both lenses and mirrors may be employed in such instruments, the mirrors being advantageous in regions of the spectrum in which totally transparent lens material may not be available or when multiple wavelength capability is desired. The mirrors are also preferred for their rigidity to insure dimensional stability in the case of very large elements, and in situations wherein a large amount of curvature is required in an optical surface.

One problem attendant the use of telescopes and cameras becomes apparent in the viewing of an object which radiates relatively weak light in a situation wherein there is a relatively strong source of light nearby, in terms of angular spacing. Light from the strong source may enter the optical system and produce a glare which masks the image of the weakly radiating object. A narrow viewing angle lessens the amount of light received and/or scattered from the strong source.

A narrow viewing angle can be obtained in a telescope or camera constructed with mirrors by reflecting the rays of light back and forth between a pair of mirrors, such as between a primary mirror and a secondary mirror which are curved to have a focussing power. For example, the primary mirror may be concave and the secondary mirror may be convex. The multiple reflection permits reduction in the physical size of the telescope to provide the advantage of a more compact telescope. One such optical system having multiple reflections is shown in FIG. 1 of U.S. Pat. No. 3,527,526 issued in the name of Silvertooth or in copending patent application, Ser. No. 06/636,892 filed Aug. 2, 1984 by John P. Bagby, one of the inventors herein. However, the problem remains in that such optical systems may not provide as much isolation of the radiation from the strong source as may be desired. In addition, a further problem arises in that the conventional continuous optical surfaces utilized in the multiple reflections, such as spherical, paraboloidal, aspheric and ellipsoidal surfaces, introduce a compromise between the attainment of even the narrow viewing angle desired versus the desired clarity in the image of the object being viewed, even if only slightly off the optical axis.

SUMMARY OF THE INVENTION

The foregoing problem is overcome and other advantages are provided by an optical system employing multiple reflection between non-continuous mirrored surfaces which are curved for focussing power. In accordance with the invention, this arrangement provides a compact optical structure with a narrow viewing angle which reduces glare which might otherwise mask the image of the object. The reduction in glare is attained in the situation wherein the relatively weak radiation is being received from an object which is nearby, in terms of angular orientation relative to the line of sight or the optical axis, to a relatively strong source of radiation. In a preferred embodiment of the invention, the optical systems comprises a concave primary mirror facing a convex secondary mirror, both being symmetrically formed about a common optical axis.

In accordance with the invention, either or the primary mirror and the secondary mirror comprise concentric radial zones having cylindrical symmetry about the common optical axis. Each zone is utilized for a separate stage in a sequence of multiple reflections. The zones are formed on a single substrate in the primary mirror and on a single substrate in the secondary mirror, with each zone being specifically angled and curved for directing each leg of the multiple-reflection optical path while optimizing the clarity of the resulting image. The use of the separate zones for each leg of an optical path permits compensation for the first order aberrations such as coma, astigmatism, spherical aberration, and field curvature.

Such concentric zones may be incorporated in an optical system having yet further devices for the isolation of extraneous rays of radiation which may emanate from a strong source near the object, or from surfaces within the optical system itself. Such devices are provided, in accordance with a further feature of the invention by providing both the primary and the secondary mirrors with apertures through which converging bundles of rays can propagate. Each aperture opens into a tubular barrier which blocks any light which may be propagating along paths outside the foregoing bundle of rays. In addition, the tubular barrier extending from the aperture in the secondary mirror includes a curved quatenary mirror which directs rays between the barriers to maximize the system's capability for the rejection of extraneous light. The curvature of the quatenary mirror may be selected to provide for collimation or focussing of the reflected rays. If desired, the quatenary mirror may be replaced with a retrocollimator for checking alignment of the optical system.

BRIEF DESCRIPTION OF THE DRAWINGS

The foregoing aspects and other features of the invention are explained in the following description, taken in connection with the accompanying drawings wherein.

DETAILED DESCRIPTION

Figure 1:
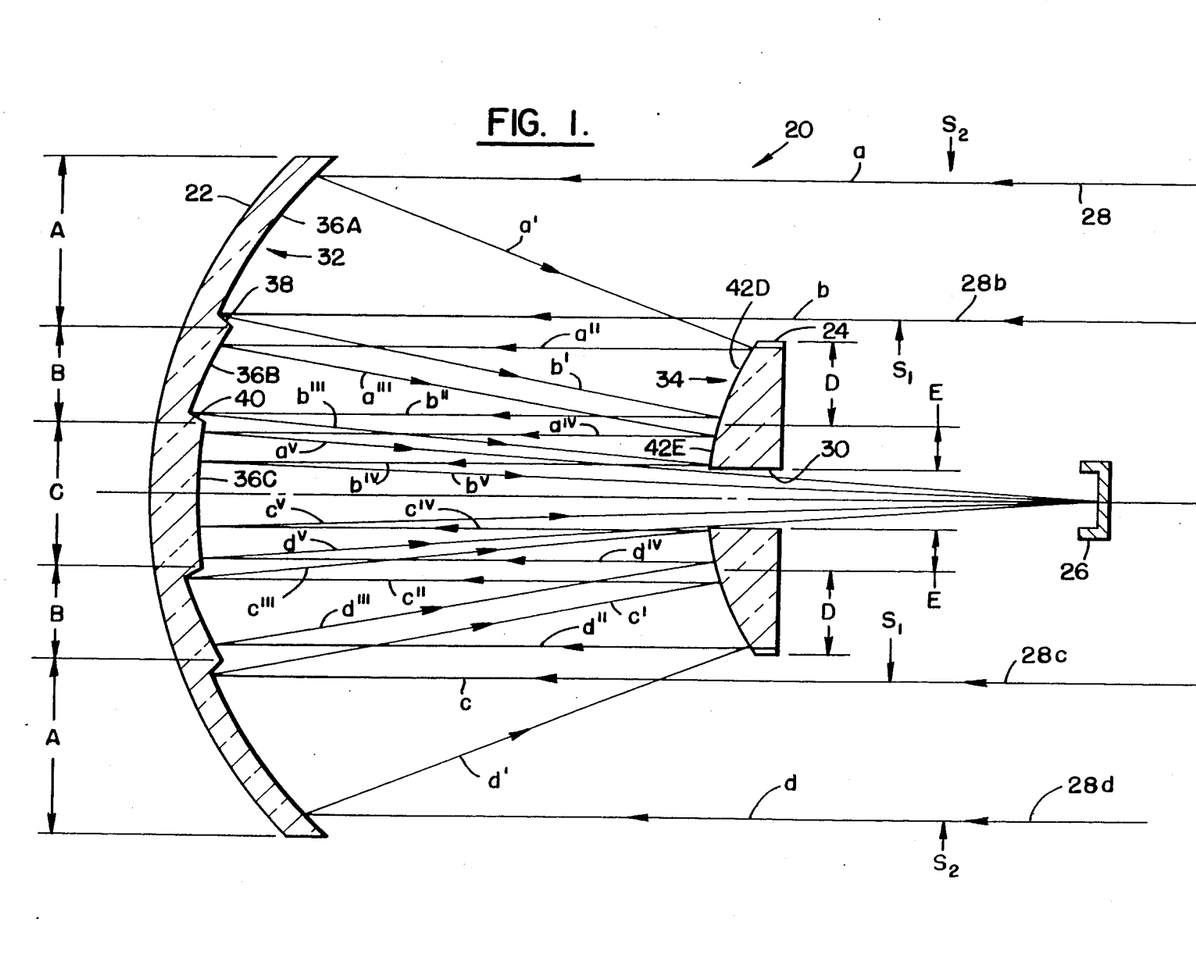
FIG. 1 is a sectional view taken along the optical axis of a telescope constructed in accordance with the invention, the figure showing individual zones of a primary mirror in exaggerated view to facilitate explanation of the invention.

FIG. 1 shows a telescope 20 comprising a primary reflector 22, a secondary reflector 24 and a detector 26 of radiant energy. To simplify the figure, a housing and spider arrangement of well-known configuration has been deleted. The housing and spider hold the secondary reflector 24 and the detector 26 in position relative to the primary reflector 22. Rays 28 of radiation are emitted from a distant object or source (not shown) and impinge upon the primary reflector 22 to undergo multiple reflections between the primary reflector 22 and the secondary reflector 24. The sequence of reflections terminates upon the passage of the final sections of the rays 28 via an aperture 30 in the secondary reflector 24 to the detector 26. The aperture 30 is located in the center of the secondary reflector 24 on the optical axis of the telescope 20. Both the primary reflector 22 and the secondary reflector 24 are formed with cylindrical symmetry about the optical axis, the primary reflector 22 having a generally concave reflecting surface 32 and the secondary reflector 24 having a convex surface 34.

In accordance with a feature of the invention, the concave surface 32 is formed as a set of coaxial zones 36 with individual ones of the zones being further identified by the legends A, B, and C. The zone 36A is formed at the outer perimeter of the concave surface 32 to provide for the first reflection of the incoming rays 28 towards the convex surface 34 of the secondary reflector 24. The next zone 36B receives rays 28 reflected from the secondary reflector 24 back towards the primary reflector 22. The zone 36B then reflects the rays back towards the secondary reflector 24 for a subsequent reflection therefrom back towards the central zone 36C. The zone 36C then reflects the rays 28 along the final segment of their path to the detector 26.

To facilitate an understanding of the operation of the telescope 20, individual ones of the rays 28 are identified by letters a, b, c, and d. Subsequent reflections of these rays are then identified by the use of the prime sign. Outer boundary rays a and d, and inner boundary rays b and c, are depicted in the figure so as to delineate the active regions of each of the zones 36. In accordance with the invention, the boundaries of each zone are selected so that each zone participates in only one reflection of the rays 28. Thus, the zone 36A participates in the first reflection, while the zones 36B and C participate in the third and fifth reflections respectively. The second and fourth reflections are accomplished by the convex surface 34 of the secondary reflector 24.

The entire concave surface 32 can be formed in a single operation utilizing well known equipment for the automatic positioning of a cutting tool, such as a diamond stylus, which tool is automatically moved about and positioned to form the zones 36 within the surface 32. While the depths of the zones 36 are shown in exaggerated view in FIG. 1, it is to be understood that the excursions of the zones 36 from that of a continuous, unbroken surface may be much smaller than those depicted and, in addition, the interfacing edges 38 and 40 may introduce no more than a minor perturbation in the smoothness of the surface so as to permit the entire surface 32 to be fabricated by the aforementioned automatic equipment. The interfacing edges 38 and 40 are shown exxaggerated in FIG. 1 in order to show better the separations between the respective zones 36. Both the primary reflector 32 and the secondary reflector 24 are readily fabricated as metallic mirrors.

If desired, the convex surface 34 of the secondary reflector 24 may be similarly constructed of two separate concentric zones 42D and E. This provides the designer of the telescope 20 with yet further freedom in the eslection of the optical surfaces utilized in imaging the rays 28. It is noted that the portrayal of the zones D-E is not exaggerated as in the portrayal of the zones 36A-C, but that the perturbations in the surface between the zones 42D-E may be also sufficiently small so as to permit the entire surface 34 with its zones to be fabricated by the aforementioned automatic machinery.

Figures 1A, 4, 5B:
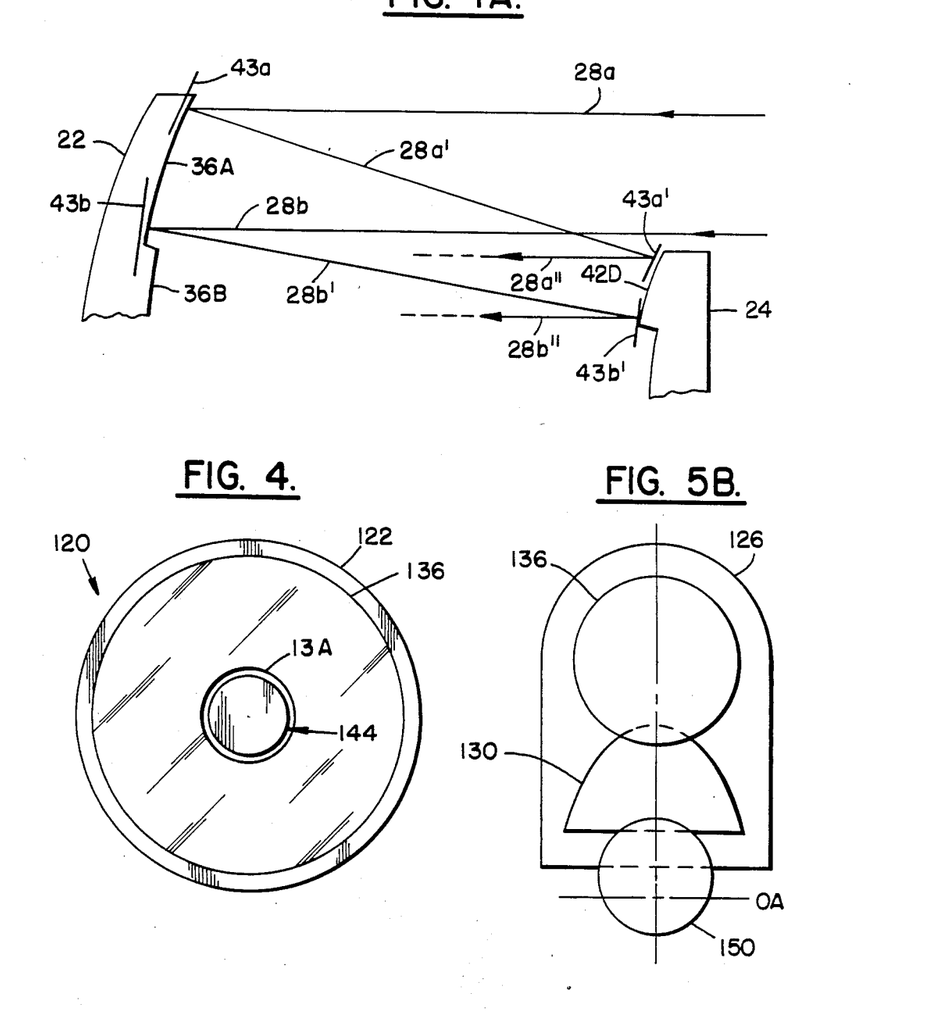
FIG. 1A is enlarged fragmentary view of the optical arrangement of FIG. 1 showing details of construction.
FIG. 4 is an end view of the telescope of Figure 3 taken along the line 4—4 in FIG. 3.

With reference also to FIG. 1A, the optical system of FIG. 1 is constructed by use of well-known ray-tracing techniques. The diameter of the secondary reflector 24 is substantially smaller than the diameter of the primary reflector 22 so as to permit incident rays 28 to impinge upon the concave surface 32 of the primary reflector 22 with no more than minimal blockage by the structure of the secondary reflector 24. The rays 28a–b in the upper half of the sectional view of FIG. 1, shown also in the fragmentary view of FIG. 1A, represent bounding rays of light incident upon the telescope 20, which rays pass by the secondary reflector 24 without blockage by the reflector 24. In three dimensional space, the bounding rays 28a–b represent inner and outer cylindrical surfaces of the light incident upon the concave surface 32 of the primary reflector 22.

With reference to the two-dimensional presentation of FIGS. 1 and 1A, incident light is reflected by the zone 36A to the zone 42D. The area of the zone 36A is much larger than the area of the zone 42D, the inner diameter of the zone 36A being approximately equal to the diameter of the secondary reflector 24. the relative sizes of the zones 36 and 42 as projected on a plane normal to the axis of the telescope 20 are indicated in FIG. 1 by the letters A, B, C, D, and E. The relative sizes of the dimensions represented by the letters A-E may be selected as is convenient in the construction of the telescope 20, with the orientations and curvatures of respective ones of the zones 36 and 42 being selected to conform to the sizes of the dimensions A-E. Selection of the orientations and the curvatures of the zones 36 and 42 is best shown in the construction of FIG. 1A.

With respect to the zone 36C, only the outer peripheral portion is presently employed for reflecting light from the zone 42E to the detector 26. The entire portion of zone 36C may be made flat, with the figure and curvature of the zone 43E being selected for reflecting light off of the zone 36C to clear the aperture 30 for impingement upon the detector 26. While the outer peripheral portion of the zone 36C is shown as curved, by way of an alternative embodiment (not shown), with the introduction of corresponding less curvature of the zone 42E, a flat surface to zone 36C can be used in an imaging system.

In FIG. 1A the ray-tracing technique is demonstrated for the zone 36A. Two tangents 43a and 43b are drawn to the zone 36A at the top and bottom portions thereof at the points of reflection respectively of the rays 28a and 28b. A normal to the tangent 43a at the point of tangency bisects the angle between the rays 28a and 28b'. A normal to the tangent 43b at the point of tangency bisects the angle between the rays 28b and 28b'. Therefore, by establishing the paths of the rays 28a' and 28b', followed by construction of the foregoing normals and the respective tangents, the directions of the arc of the zone 36A at both ends of the arc are defined. The balance of the arc is then filled in by construction of a smooth curve, which curve is a second order curve (parabola). Extension of the foregoing construction to three dimensions provides the desired surface to the zone 36C, a paraboloid.

The foregoing procedure continues with positioning of tangents 43a' and 43b' upon the arc of the zone 42D. First, the bounding rays 28a'' and 28b'' are drawn from the end points of the zone 42D to the end points of the zone 36B. The tangent 42a' is positioned at the end point of the zone 42D to the end points of the zone 36B. The tangent 43a' is positioned at the end point of the zone 42D and oriented such that a normal to the tangent 43a' at the point of tangency bisects the angle between the rays 28a' and 28a''. Similarly, the tangent 43b' is positioned at the other end of the zone 42D and oriented such that a normal to the tangent at the point of tangency bisects the angle between the rays 28b' and 28b''. This establishes the positions and orientations of the tangents 43a' and 43b', and also establishes the directions of the arc of the zone 42D at the end points thereof. The balance of the arc is then filled in by construction of a smooth curve, which curve is a second order curve (parabola). Extension of the foregoing construction to three dimensions provides the desired surface to the zone 42D, a paraboloid. This procedure then continues for construction of the remaining zones 36B and 42E to complete the telescope 20.

By virtue of the foregoing use of independent zones 36A–C within the common concave surface 32, and the zones 42D–E on the common convex surface 34, the precise orientation of the individual regions of the surface 32 and the surface 34 can be closely held rigid and, thus, permanently defined so as to correct for any aberrations while assuring the easy aligning and maintenance of the imaging of the objects upon the detector 26. As a result, the complexity of the fully capable optical arrangement for the telescope 20 can be accomplished without sacrificing clarity in the imaging process.

Figure 2:
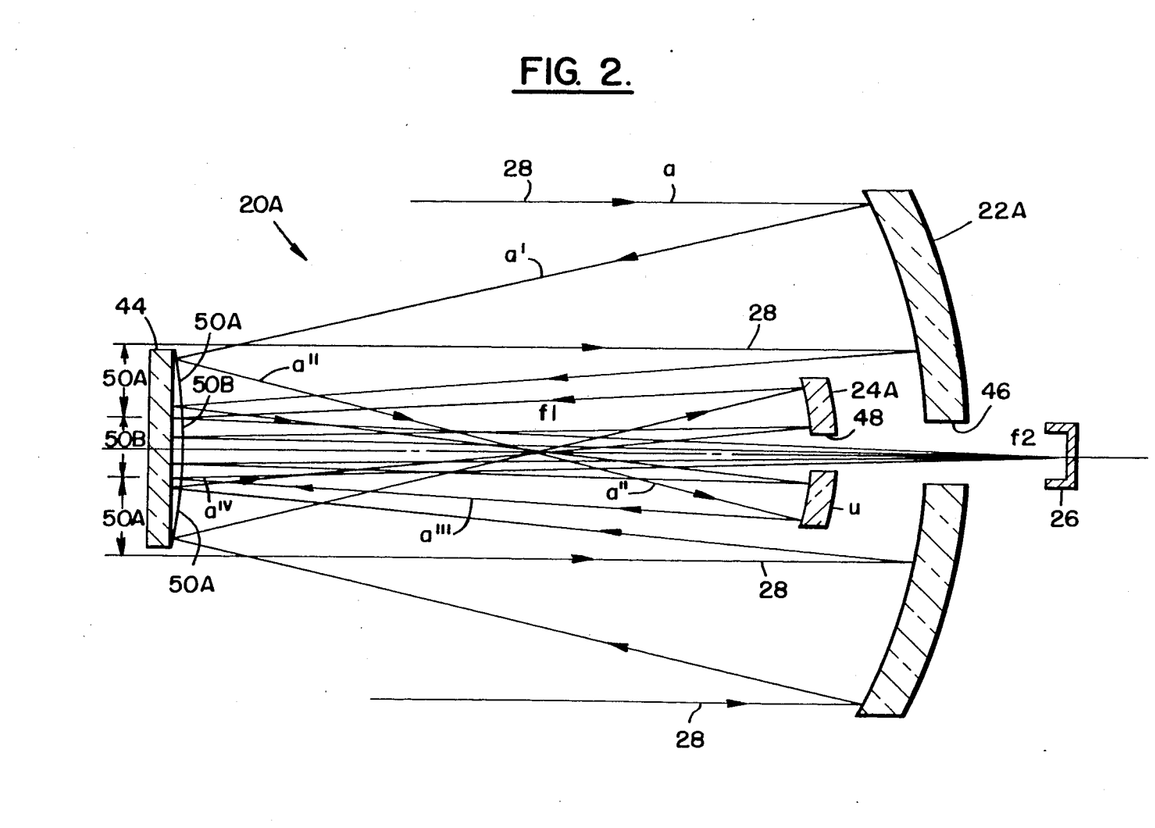
FIG. 2 is an alternative embodiment of the telescope of FIG. 1 wherein the active optical surfaces are folded about a substantially planar mirror having corrective zones in accordance with the invention.

FIG. 2 shows a telescope 20A which is an alternative embodiment of the optical system of FIG. 1, the telescope 20A incorporating a primary reflector 22A and a secondary reflector 24A which are optically coupled by a folding mirror 44. Both of the reflectors 22A and 24A are readily fabricated as metallic mirrors, each having concave surfaces which face the mirror 44. The reflectors 22A and 24A are provided with central apertures 46 and 48 which are positioned along an optic axis of the telescope 20A. The focus $F_1$ of the primary reflector 22A is shown positioned on the optic axis between the secondary reflector 24A and the folding mirror 44. The resulting focus from the use of both reflectors 22A and 24A is shown at $F_2$ on the optic axis behind the reflector 22A. Rays 28 from a distant object are shown impinging upon the concave surface of the primary reflector 22A, the rays undergoing a sequence of reflections between the reflectors 22A and 24A and the nominally flat mirror 44 as disclosed by the lettering of the rays 28, the convention of the lettering and the use of the prime sign following that of FIG. 1.

In accordance with the invention, the capacity for the correction of aberrations is attained by the use of quasi flat zones within a reflecting surface, two such zones 50A–B being provided on the reflecting surface of the mirror 44. Thus, the operation and function of the zones 50A–B corresponds to that disclosed above with reference to the zones 36A–C. Thus, the zone 50A at the outer periphery of the mirror 44 reflects radiation from the primary reflector 22A to the secondary reflector 24A. The central zone 50B reflects radiation from the secondary reflector 24A back through the apertures 48 and 46 into the detector 26. By way of example, the detector 26 may be a phototransistor or other form of photodetector in the case of radiation and visual spectrum. In the case of infra-red radiation, the detector 26 may be a any one of well-known forms of infra-red detectors such as those operating in cryogenic temperatures.

By virtue of the multiple reflections, and the elongated focal lengths of the optical system of the telescope 20A, as evidenced by the focus $F_2'$ sources of spurious radiation add relatively little glare which might otherwise mask the image of an object, the image appearing at the detector 26. For example, in the case of a strong source of radiation near to the object of interest, in terms of angular orientation of the source and object relative to the telescope 20A, and further assuming radiation from the object which is substantially weaker than those of nearby strong source, the rays of radiation from the strong source would be blocked by the structure of the reflectors 22A and 24A since only the object rays 28 are so oriented as to pass through both of the apertures 48 and 46 to reach the detector 26. Construction of the surfaces of the respective zones follows the procedure set forth above for the system of FIG. 1.

Figure 3:
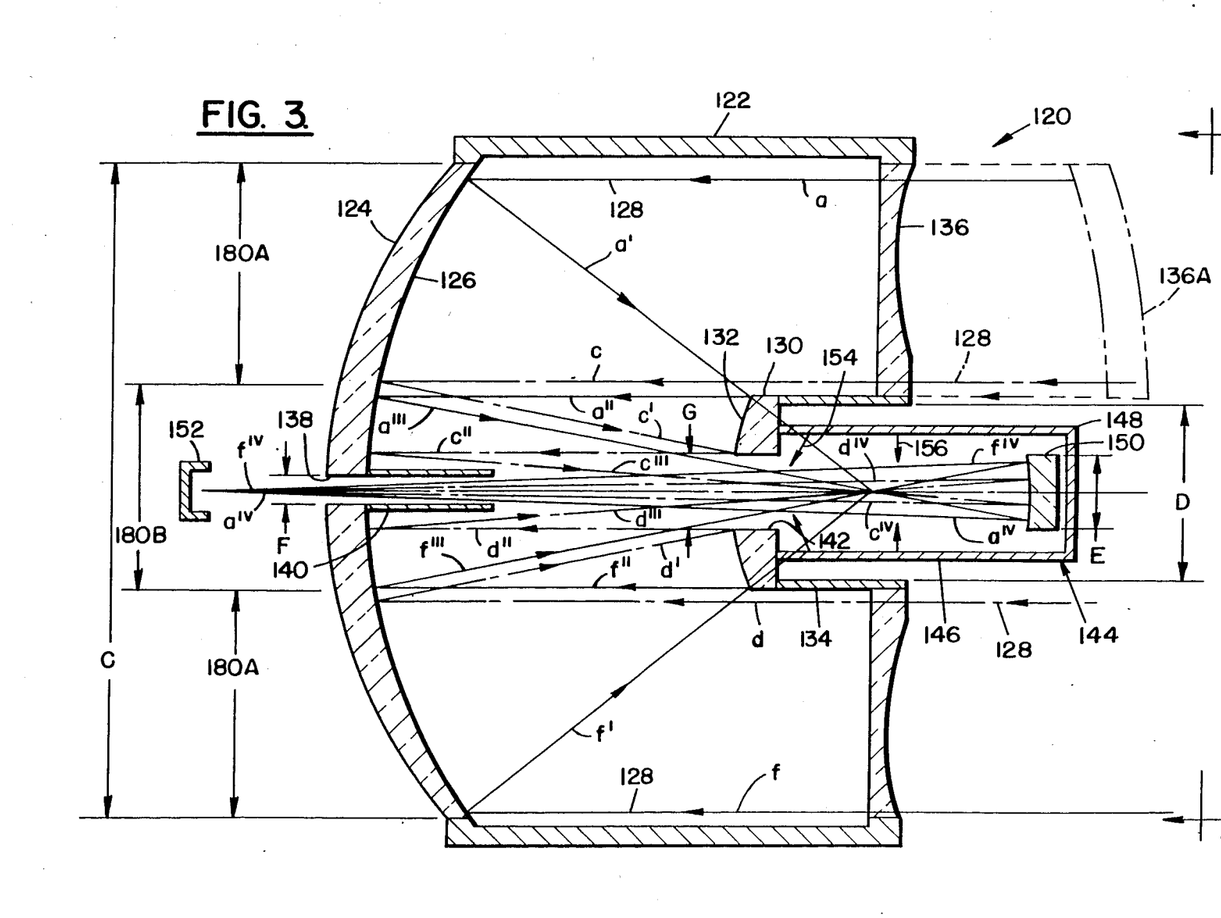
FIG. 3 is a further embodiment of the telescope of FIG. 1, shown in sectional view, the embodiment of FIG. 3 including apertures in both the primary and secondary reflecting surfaces with an additional mirror disposed forward of the focus of the primary reflector for directing rays of radiation through both apertures, the primary reflector having zones for respective reflections of a ray in accordance with the invention.

The narrow field of view and the off-axis rejection of radiation from a strong source, as provided by the embodiments of the invention of FIGS. 1 and 2 can be further enhanced by the embodiment of the invention disclosed in FIGS. 3 and 4.

In FIGS. 3 and 4, a telescope 120 comprises a housing 122 which supports a primary reflector 124 having a concave surface 126 facing incoming rays 128 of radiation from an object (not shown) being viewed. The telescope 120 further comprises a secondary reflector 130 having a convex surface 132 which faces the primary reflector 124. The secondary reflector 130 is held in position relative to the primary reflector 24 by means of a support tube 134 and a lens 136. The lens 136 connects the support tube 134 to a rim of the housing 122. The lens 136 may be in the form of a Schmidt corrector or, alternatively, by a lens 136A, shown in phantom, which is a Marksuto-Bowers-Pfenning corrector.

To provide for increased off-axis rejection of extraneous rays of radiation, for example, of rays (not shown) from a relatively small source of radiation nearby the object, an aperture 138 is placed in the center of the primary reflector 134 along the optical axis of the telescope 120. A tubular barrier 140 extends from the periphery of the aperture 138 towards the secondary reflector 130, and serves as a stop to extraneous rays which would be angled differently to the rays 128 so as to reject such rays from the region of the focus of the telescope 120.

In addition, an aperture 142 is placed at the center of the secondary reflector 130 along the optical axis, and a chamber 144 extends from the backside of the secondary reflector 130 in a direction away from the primary reflector 124. The aperture 142 opens into the chamber 144. The chamber 144 comprises a tubular wall 146 which terminates in an end wall 148. A quatenary mirror 150 is disposed within the chamber 144 at the end wall 148, the mirror 150 having a concave optical surface which faces the aperture 142.

A detector 152 of the radiant energy from the object is placed behind the primary reflector 124 along the optical axis of the telescope 120. The rays 128 undergo multiple reflections between the primary reflector 124 and the secondary reflector 130, with the final sections of the reflections of the rays 128 being the passage of radiant energy from the concave surface 126 to the quaternary mirror 150, with the quaternary mirror 150 then reflecting the rays 128 back through the apertures 142 and 138 to the detector 152.

As disclosed with reference to FIGS. 1 and 2, the individual rays 28 are furthered identified by letter a, c, d, and f with the subsequent reflections being identified by the use of prime signs to disclose the paths of propagation of the radiant energy between the optical elements of the telescope 120. By use of the plurality of reflections among the curved surfaces of the reflectors 124 and 126 and the mirror 150, the equivalent focal length of the primary reflector 124 is extended to a much greater distance, which distance becomes the focal length of the telescope 120. In addition, the series of reflections greatly narrows the viewing angle so as to reduce off-axis sensitivity of the telescope 120 to extraneous radiation from sources other than the radiation from the objects being viewed. If desired, stops 154 and 156 may be positioned within the chamber 144 to further intercept any extraneous rays of radiation so as to further improve the off-axis rejection capability of the telescope 120. It is also noted that, if desired, the surface of the quaternary mirror 150 may be altered to provide for a collimated beam of radiation (not shown), whose rays would be directed towards the primary reflector 124. In order to accommodate the collimated bundle of rays, the aperture 138 in the priamry reflector 124 would be enlarged in diameter and, in addition, the axial length of the tubular barrier 140 would be decreased so as to provide room for the propogation of the rays 128.

Both the lenses 136 and 136A may have curved surfaces for improving the quality of the image of the object. The lens 136 (or 136A) is to be placed near to the focal plane of the primary reflector 124 so that any spurious rays of radiation emanating from imperfections or dirt on the surface of the lens 136 would be spread apart from parallel rays 128 rather than be included in the converging packet shown in FIG. 3, so that the spurious, non-parallel rays are blocked by the tubular barrier 140 and the tubular walls 146. Accordingly, the arrangement of an optical element and the stops of the telescope 120 provide the desired feature off-axis rejection.

In accordance with a feature of the invention, the concave surface 126 and the convex surface 132 are each provided with zones, the zones 180A and B being formed integrally with the concave surface 126 and the zone 182 D being formed integrally with the convex surface 132. The spacing between the concave surface 126 and convex surface 132, as well as a formulation of the zones 180A and 180B, are the equivalent of those disclosed for the zones 136 A–C and 142 D–E of FIG. 1. The zones 180A and 180B permit the designer of a telescope, such as the telescope 120, to alter the shapes of the active optical surfaces so as to correct for aberration, and thereby enhance the image quality while retaining the capacity for the off-axis rejection of supriuous radiation. Telescope 120 thereby provides for a high-quality image of an object without the glare associated with a source of high intensity radiation nearby, in terms of angular orientation, from the object being imaged.

Figure 5A:
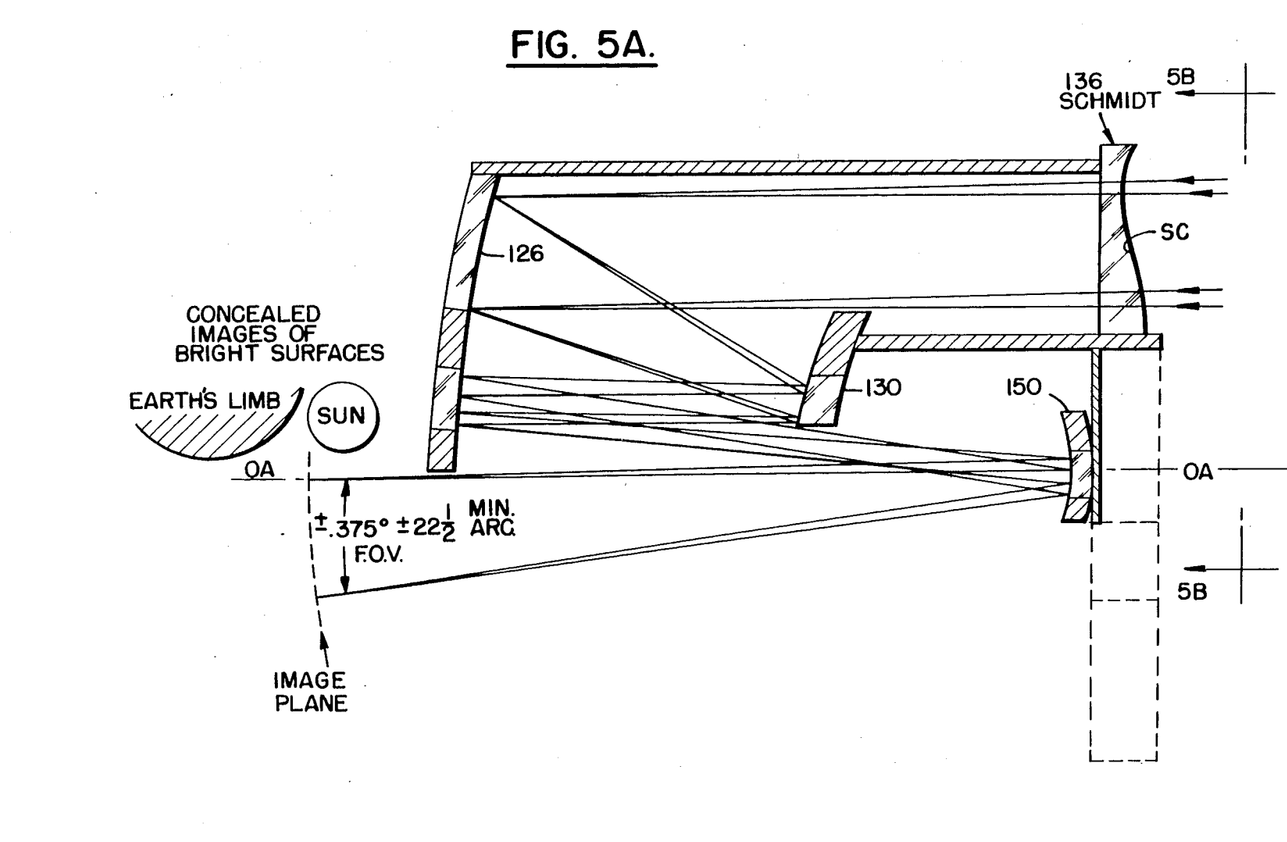
FIG. 5 is a diagrammatic view of a modification of the optical structure of FIG. 3 demonstrating the use of the invention in a wide-angle optical system.

In the embodiment illustrated in FIGS. 3 and 4, the wide angle capability of the Schmidt/Maksutov telescope is not used. However, this capabilty may be combined with the present invention, as demonstrated diagrammatically in FIG. 5, by removing up to approximately three-quarters of reflector 124 and lens 136 to 136A. This combined use is possible because the wide angle capability is off-axis from that portion of the optics required for the present invention. For example, it may be desired to block sunlight by that remaining portion of reflector 124, but still view fields of view away from the sun and angled from the axis of telescope 120.

It is to be understood that the above described embodiments of the invention are illustrative only, and that modifications thereof may occur to those skilled in the art. Accordingly, this invention is not to be regarded as limited to the specific embodiments disclosed herein, but is to be limited only as defined by the appended claims.

We claim:

1. An optical system capable of guiding radiation from a distant source of radiation to a sensor of the radiation, said system comprising:

a primary reflector having a curved surface facing radiation from said source;

a secondary reflector having a curved surface facing the curved surface of said primary reflector;

at least one of said curved surfaces comprising a set of concentric zones for receiving radiations reflected from the other of said curved surfaces for the forming of an image of said object; wherein said surfaces are disposed relative to each other to implement a sequence of multiple reflections of rays of radiant energy from said object to said image, said sequence of multiple reflections increasing the focal length of said optical system to provide for a reduced viewing angle and increased offaxis rejection of extraneous radiation, each of said zones being positioned for intercepting only one leg of a pass in said sequence of reflections, and each of said zones being separately formulated for adjusting the orientation of a leg of said sequence of reflections to compensate for aberrations in the forming of said image; and wherein the curved surface of the primary reflector is concave and the curved surface of said secondary reflector is convex; said system further comprising first and second apertures disposed respectively in said primary reflector and said secondary reflector, one of said apertures being positioned for receiving reflections in said series of reflections, and wherein said system further comprises means for directing radiation between said apertures for the formation of an image of said object behind one of said reflectors.

2. A system according to claim 1 further comprising a tubular barrier communicating with one of said apertures to further exclude extraneous radiation as may be emitted from an off-axis source of such radiation.

3. A system according to claim 1 wherein one of said zones is a central zone, one of said apertures being located in said central zone, and wherein said one aperture encompasses a major portion of said central zone for wide-angle viewing.

4. An optical system capable of guiding radiation from a distant source of the radiation to a sensor of the radiation, said system comprising:
   a primary reflector having a curved optical surface for use in focussing rays of radiation;
   a secondary reflector having a curved optical surface for use in focussing rays of the radiation;
   a folding mirror facing each of said optical surfaces for reflecting rays of radiation between said two optical surfaces, the reflection of rays between said two optical surfaces providing for an increasing of focal length beyond the focal length of a single one of said reflecting surfaces resulting in a narrowed viewing angle which excludes radiation from another source of radiation positioned away from an optical axis directed at said first mentioned source of radiation; wherein
   a reflecting surface of said folding mirror includes a set of zones, one of said zones being configured for the reflection of radiation between said two reflecting surfaces, and another of said zones being configured for reflection of rays of radiation from said second reflector to said sensor; wherein
   each of said optical surfaces is concave; and wherein
   each of said optical surfaces has a cylindrical symmetry about a common optical axis, each of said reflectors having an aperture therein, and wherein said apertures are aligned along a path of radiation from said folding mirror to said sensor for further exclusion of light from another source spaced apart from said first mentioned source.

5. A system according to claim 4 wherein each of said zones is constructed on a common substrate, and wherein the interfacing perturbations in a region of the mirror surface bounding two of said zones is sufficiently smooth to permit the manufacture of said set of zones in a single continuous milling operation.

* * * * *